United States Patent
Lecuit

(10) Patent No.: US 6,533,059 B2
(45) Date of Patent: Mar. 18, 2003

(54) TRANSMISSION CROSS MEMBER FOR ACCOMMODATING A DUAL EXHAUST SYSTEM AND REPLACING AN EXISTING TRANSMISSION CROSS MEMBER ACCOMMODATING A SINGLE EXHAUST SYSTEM

(76) Inventor: John R. Lecuit, 7 Circle Pl., Speonk, NY (US) 11972

( * ) Notice: Subject to any disclaimer, the term of this patent is extended or adjusted under 35 U.S.C. 154(b) by 12 days.

(21) Appl. No.: 09/896,397

(22) Filed: Jun. 30, 2001

(65) Prior Publication Data

US 2003/0000762 A1 Jan. 2, 2003

(51) Int. Cl.⁷ .............................................. B62D 21/00
(52) U.S. Cl. ...................... 180/311; 280/781; 296/203.1
(58) Field of Search .............................. 180/311, 55, 58, 180/291, 374, 377; 280/78.1; 296/203.1

(56) References Cited

U.S. PATENT DOCUMENTS

| 3,084,971 A | * | 4/1963 | Schilberg ..................... 280/782 |
| 3,889,772 A | * | 6/1975 | Kelley ........................ 138/178 |
| 3,940,176 A | * | 2/1976 | Ito et al. ..................... 180/291 |
| 4,085,816 A | * | 4/1978 | Amagai et al. ............. 180/89.2 |
| 4,270,625 A | * | 6/1981 | Nishimura et al. .......... 180/291 |
| 4,271,920 A | * | 6/1981 | Barthelemy .................. 180/12 |
| 4,406,343 A | * | 9/1983 | Harasaki ..................... 180/297 |
| 4,638,965 A | * | 1/1987 | De Bruine et al. ......... 180/89.2 |
| 5,078,230 A | * | 1/1992 | Hasuike ..................... 180/291 |
| 5,183,286 A | * | 2/1993 | Ayabe ..................... 280/124.1 |
| 5,454,453 A | * | 10/1995 | Meyer et al. ............... 180/377 |
| 5,823,287 A | * | 10/1998 | Chidamparam et al. ..... 180/312 |
| 5,844,177 A | * | 12/1998 | Pirchl ........................ 180/89.2 |
| 5,884,722 A | * | 3/1999 | Durand et al. .............. 180/312 |
| 5,884,963 A | * | 3/1999 | Esposito et al. ............ 280/784 |
| 6,141,958 A | * | 11/2000 | Voss ............................ 138/177 |
| 6,209,914 B1 | * | 4/2001 | Grieser et al. .............. 180/291 |
| 6,213,245 B1 | * | 4/2001 | Murata et al. .............. 180/312 |
| 6,408,974 B1 | * | 6/2002 | Viduya et al. .............. 180/312 |

* cited by examiner

*Primary Examiner*—Brian L. Johnson
*Assistant Examiner*—Kelly E Campbell

(57) ABSTRACT

A dual exhaust system transmission cross member that replaces an existing single exhaust system transmission crossmember. The crossmember includes a center portion that mounts the transmission, a pair of intermediate portions that extend from the center portion and straddle the tail piece of the transmission, and a pair of outer portions that extend from the pair of intermediate portions, respectively, and are attached to the pair of side rails. Each intermediate portion is inverted U-shaped so as to accommodate the head pipes of the dual exhaust system. The outer portion that is positioned on the passenger side of the vehicle slants rearwardly from the associated intermediate portion, while the outer portion that is positioned on the driver side of the vehicle slants forwardly from the associated intermediate portion.

13 Claims, 3 Drawing Sheets

TRANSMISSION CROSS MEMBER FOR ACCOMMODATING A DUAL EXHAUST SYSTEM AND REPLACING AN EXISTING TRANSMISSION CROSS MEMBER ACCOMMODATING A SINGLE EXHAUST SYSTEM

BACKGROUND OF THE INVENTION

1. Field of the Invention

The present invention relates to a transmission cross member for accommodating a dual exhaust system. More particularly, the present invention relates to a transmission cross member for accommodating a dual exhaust system and replacing an existing transmission cross member accommodating a single exhaust system.

2. Description of the Prior Art

Numerous innovations for cross member related devices have been provided in the prior art that will be described. Even though these innovations may be suitable for the specific individual purposes to which they address, however, they differ from the present invention in that they do not teach a transmission cross member for accommodating a dual exhaust system and replacing an existing transmission cross member accommodating a single exhaust system.

FOR EXAMPLE, U.S. Pat. No. 5,823,287 to Chidamparam et al. teaches a mounting assembly that mounts each end of a transmision cross member to a body rail. The mounting assembly includes a cross member sleeve which reduces pre-compression compression buckling of the transmission cross member. A rail sleeve stiffens the local area of the body rail while adding little weight. A cover plate is secured to the body rail via welding and to the rail sleeve with two bolts. A body rail bracket is also fixedly secured between the cross member sleeve and the body rail to increase the stiffness thereof. The increased stiffness reduces vibrational noise generated by a transmission of a motor vehicle.

ANOTHER EXAMPLE, U.S. Pat. No. 5,454,453 to Meyer et al. teaches a break-away bracket for connecting structural beams in a vehicle such as connecting a transmission cross-member to a frame rail. The break-away bracket connects to the cross-member by use of a connecting pin. During normal operation, the cross-member is fixed to the bracket, which, in turn, is welded to the frame rail and acts as a normal fixed bracket. During the imposition of excessive loads on the front of the vehicle, a slot connecting between a hole for the connecting pin and an edge of the bracket allows the pin and cross-member to pull away from a portion of the bracket. The bracket yields, allowing axial displacement between the cross-member and the frame rail while still keeping the connection between the two components intact.

It is apparent that numerous innovations for cross member related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a transmission cross member for accommodating a dual exhaust system and replacing an existing transmission cross member accommodating a single exhaust system that avoids the disadvantages of the prior art.

ANOTHER OBJECT of the present invention is to provide a a transmission cross member for accommodating a dual exhaust system and replacing an existing transmission cross member accommodating a single exhaust system that is simple to use.

BRIEFLY STATED, STILL ANOTHER OBJECT of the present invention is to provide a dual exhaust system transmission cross member that replaces an existing single exhaust system transmission cross member. The cross member includes a center portion that mounts the transmission, a pair of intermediate portions that extend from the center portion and straddle the tail piece of the transmission, and a pair of outer portions that extend from the pair of intermediate portions, respectively, and are attached to the pair of side rails. Each intermediate portion is inverted U-shaped so as to accommodate the head pipes of the dual exhaust system. The outer portion that is positioned on the passenger side of the vehicle slants rearwardly from the associated intermediate portion, while the outer portion that is positioned on the driver side of the vehicle slants forwardly from the associated intermediate portion.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
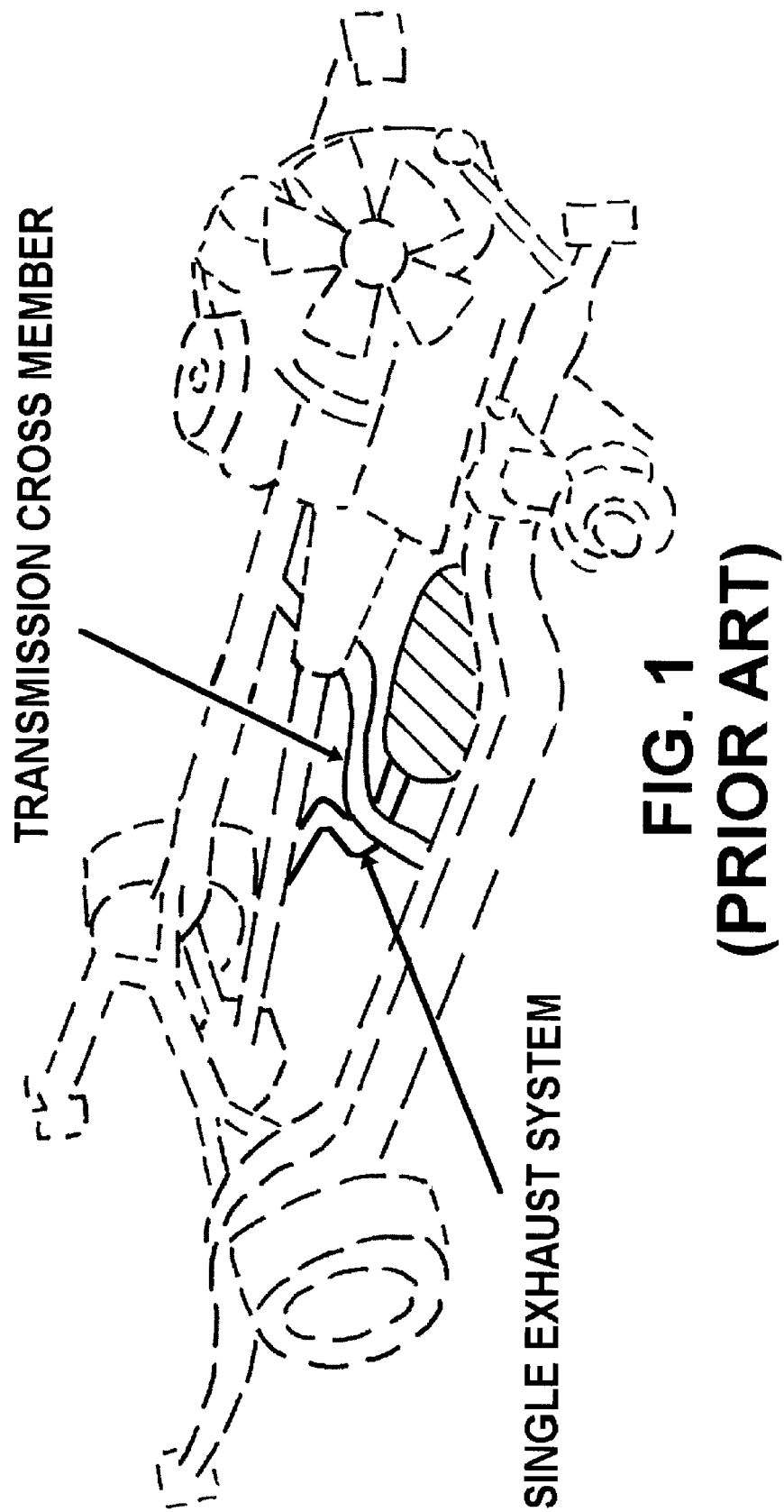
FIG. 1 is a diagrammatic perspective view of a vehicle having a transmission cross member accommodating a single exhaust system.

LIST OF REFERENCE NUMERALS UTILIZED IN THE DRAWING $H_C$ height of center portion 20
$H_F$ height of upright part 38 of mounting flange 36 of each outer portion of pair of outer portions 24
$H_I$ equal heights of pair of upright parts 28 of each intermediate portion of pair of intermediate portions 22
$H_O$ height of each outer portion of pair of outer portions 22
10 transmission cross member of present invention for accommodating dual exhaust system 12 and replacing existing transmission cross member accommodating single exhaust system of vehicle 14 having chassis 16 with pair of rails 18, driver side 19, and passenger side 21
12 dual exhaust system 13 head pipes of dual exhaust system 12
14 vehicle
16 chassis of vehicle 14
18 pair of rails of chassis 16 of vehicle 14
19 driver side of chassis 16 of vehicle 14
20 center portion for mounting the transmission
21 passenger side of chassis 16 of vehicle 14
22 pair of intermediate portions for straddling tail piece of transmission and accommodating dual exhaust system 12
24 pair of outer portions for attaching to pair of rails 18 of chassis 16 of vehicle 14
25 upper surface of center portion 20 for mounting transmission
26 pair of ends of center portion 20
27 lowermost surface of center portion 20
28 pair of upright parts of each intermediate portion of pair of intermediate portions 22
29 lowermost ends of pair of upright parts 28 of each intermediate portion of pair of intermediate portions 22
30 transverse part of each intermediate portion of pair of intermediate portions 22
32 innermost end of each outer portion of pair of outer portions 22
34 outermost end of each outer portion of pair of outer portions 22 for attaching to respective rail 18 of chassis 16 of vehicle 14
36 mounting flange of each outer portion of pair of outer portions 24 for attaching to associated rail 18 of chassis 16 of vehicle 14
38 upright part of mounting flange 36 of each outer portion of pair of outer portions 24
40 transverse part of mounting flange 36 of each outer portion of pair of outer portions 24 for positioning over, and attaching to, associated rail 18 of chassis 16 of vehicle 14
42 plurality of throughbores extend vertically through transverse part 40 of mounting flange 36 of each outer portion of pair of outer portions 24

DETAILED DESCRIPTION OF THE PREFERRED EMBODIMENT

Figure 2:
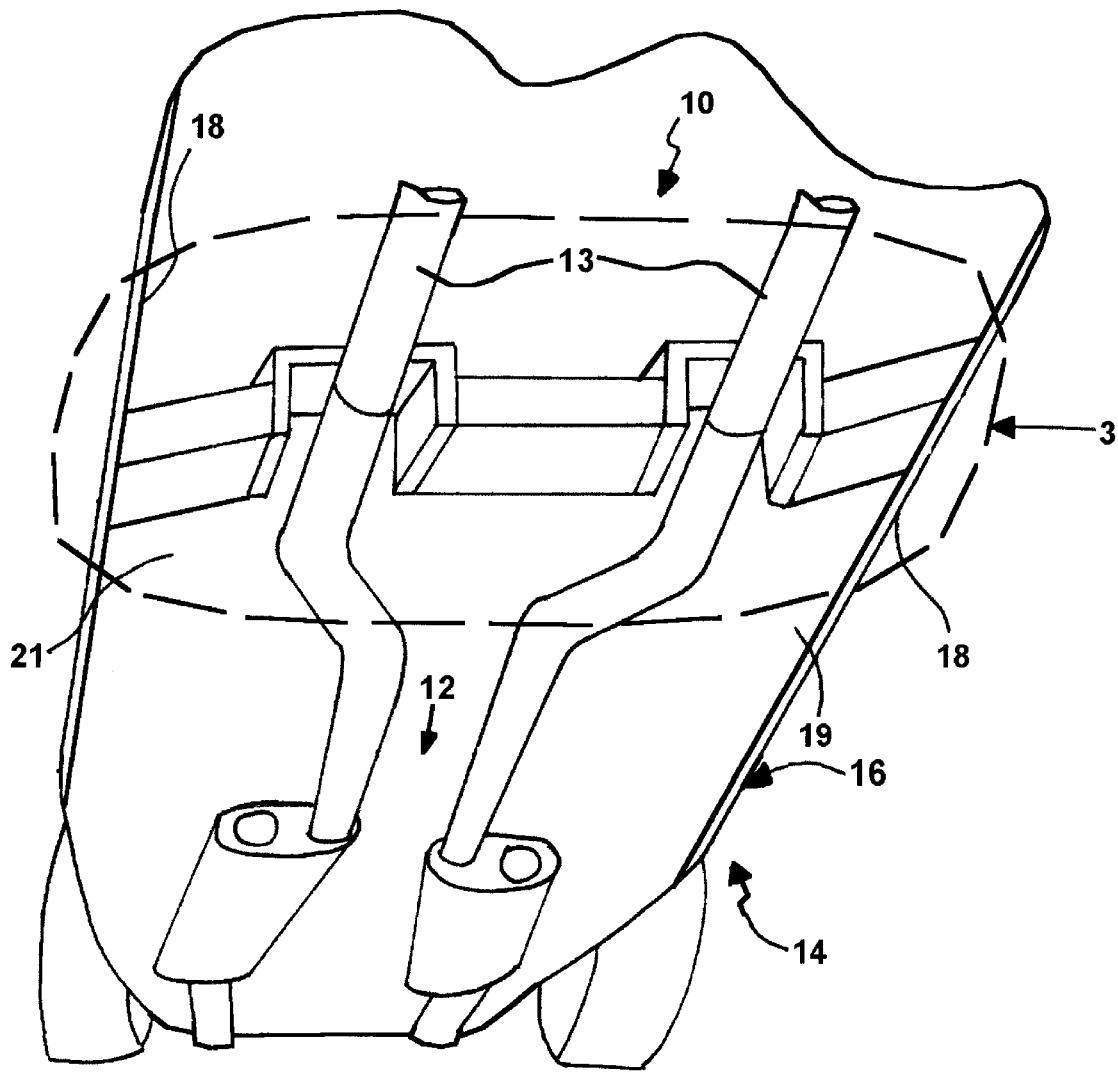
FIG. 2 is a diagrammatic perspective view of the transmission cross member for accommodating a dual exhaust system of the present invention replacing the existing transmission cross member accommodating a single exhaust system shown in FIG. 1.

Referring now to the figures, in which like numerals indicate like parts, and particularly to FIG. 2, which is a diagrammatic perspective view of the transmission cross member of the present invention for accommodating a dual exhaust system replacing the existing transmission cross member accommodating the single exhaust system shown in FIG. 1, the transmission cross member of the present invention is shown generally at 10 for accommodating a dual exhaust system 12 having head pipes 13 and replacing an existing transmission cross member accommodating a single exhaust system of a vehicle 14 having a chassis 16 with a pair of rails 18, a driver side 19, and a passenger side 21.

Figure 3:
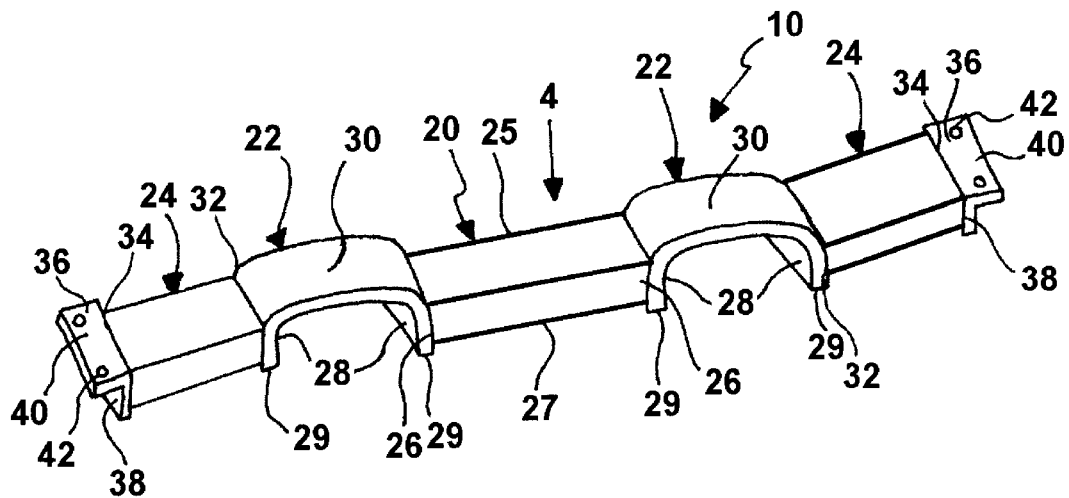
FIG. 3 is an enlarged diagrammatic perspective view of the area generally enclosed by the dotted curve identified by ARROW 3 in FIG. 2 of the present invention.
Figure 4:
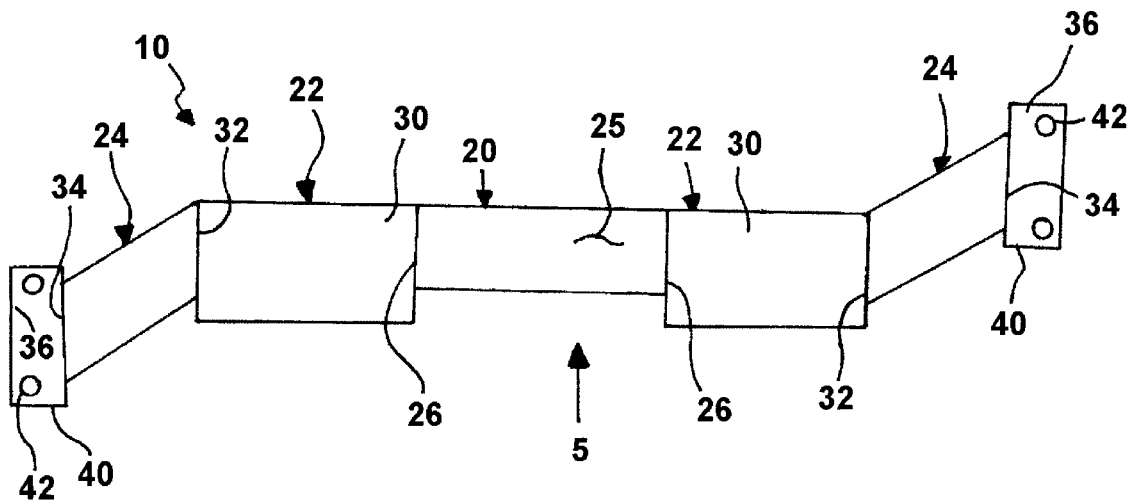
FIG. 4 is a diagrammatic top plan view taken generally in the direction of ARROW 4 in FIG. 3.
Figure 5:
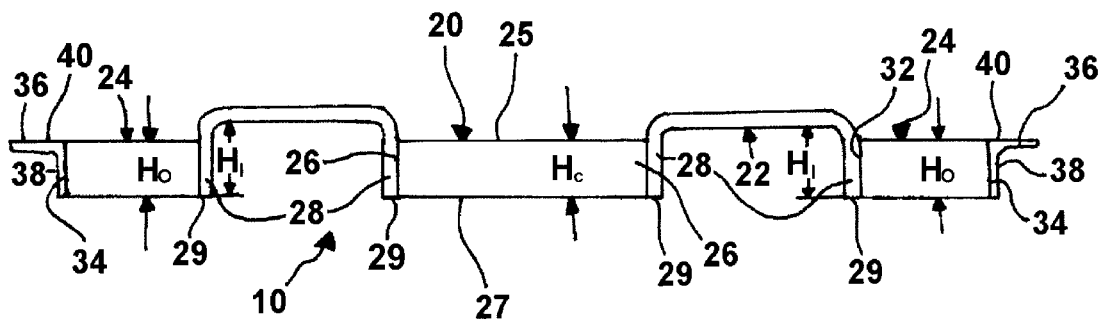
FIG. 5 is a diagrammatic front elevational view taken generally in the direction of ARROW 5 in FIG. 4.

The configuration of the transmission cross member 10 can best be seen in FIGS. 3–5, which are, respectively, an enlarged diagrammatic perspective view of the area generally enclosed by the dotted curve identified by ARROW 3 in FIG. 2 of the present invention, a diagrammatic top plan view taken generally in the direction of ARROW 4 in FIG. 3, and a diagrammatic front elevational view taken generally in the direction of ARROW 5 in FIG. 4, and as such, will be discussed with reference thereto.

The transmission cross member 10 comprises a center portion 20 for mounting the transmission, a pair of intermediate portions 22 that extend from the center portion 20 and are for straddling the tail piece of the transmission and accommodating the dual exhaust system 12, and a pair of outer portions 24 that extend from the pair of intermediate portions 22, respectively, and are for attaching to the pair of rails 18 of the chassis 16 of the vehicle 14.

The center portion 20 is straight, slender, elongated, square-shaped in lateral cross section so as form a box member, horizontally-oriented, and has an uppermost surface 25 for mounting the transmission, a pair of ends 26, a height $H_c$, and a lowermost surface 27.

Each intermediate portion 22 is for accommodating a respective head pipe of the dual exhaust system 12, is inverted U-shaped, and has a pair of upright parts 28 that are vertically-oriented and have lowermost ends 29, and a transverse part 30 that is horizontally-oriented and extends across the pair of upright parts 28 thereof.

The pair of upright parts 28 of each intermediate portion 22 have equal heights $H_I$.

The pair of intermediate portions 22 extend coaxially from the pair of ends 26 of the center portion 20, respectively, with an innermost upright part 28 of each intermediate portion 22 being coincident with a respective end 26 of the center portion 20.

The height $H_I$ of the pair of upright parts 28 of the intermediate portion 22 that is positioned on the passenger side 21 of the chassis 16 of the vehicle 14 is greater than the height $H_I$ of the pair of upright parts 28 of the intermediate portion 22 that is positioned on the driver side 19 of the chassis 16 of the vehicle 14 because the head pipe of the dual exhaust system 12 that is positioned on the passenger side 21 of the chassis 16 of the vehicle 14 mounts higher than the head pipe of the dual exhaust system 12 that is positioned on the driver side 19 of the chassis 16 of the vehicle 14.

The lowermost ends 29 of the pair of upright parts 28 of the pair of intermediate portions 22 are flush with the lowermost surface 27 of the center portion 20, with the height $H_C$ of the center portion 20 being less than the height $H_I$ of the pair of upright parts 28 of the pair of intermediate portions 22 for providing clearance for the tail piece of the transmission.

Each outer portion 24 is straight, slender, elongated, square-shaped in lateral cross section so as form a box member, horizontally-oriented, and has a height $H_O$, an innermost end 32, and an outermost end 34 for attaching to a respective rail 18 of the chassis 16 of the vehicle 14.

The pair of outer portions 24 extend from the pair of intermediate portions 22, respectively, with the innermost end 32 of each outer portion 24 being coincident with an outermost upright part 28 of a respective intermediate portion 22.

The outer portion 24 that is positioned on the passenger side 21 of the chassis 16 of the vehicle 14 slants rearwardly from the associated intermediate portion 22, while the outer portion 24 that is positioned on the driver side 19 of the chassis 16 of the vehicle 14 slants forwardly from the associated intermediate portion 22.

Each outer portion 24 further has a mounting flange 36 that extends from the outermost end 34 thereof and is for attaching to an associated rail 18 of the chassis 16 of the vehicle 14. mounting flange 36 is an angle iron that is oriented in an inverted L-shape, and has an upright part 38 that is vertically-oriented and has a height $H_F$, and a transverse part 40 that is horizontally-oriented, extends outwardly from the upright part 38 thereof, and is for positioning over, and attaching to, the associated rail 18 of the chassis 16 of the vehicle 14.

The mounting flange 36 extends outwardly from the outermost end 34 of a respective outer portion 24, with the upright part 38 thereof being coincident with the outermost end 34 of the respective outer portion 24.

The height $H_F$ of the upright part 38 of the mounting flange 36 is equal to the height $H_O$ of an associated outer portion 24 for providing a smooth attaching to an associated side rail 18 of the chassis 16 of the vehicle 14.

The transverse part 40 of the mounting flange 36 has a plurality of throughbores 42 that extend vertically therethrough and are for receiving bolts to attach the transmission cross member 10 to the pair of side rails 18 of the chassis 16 of the vehicle 14.

It will be understood that each of the elements described above, or two or more together, may also find a useful application in other types of constructions differing from the types described above.

While the invention has been illustrated and described as embodied in a transmission cross member for accommodating a dual exhaust system and replacing an existing transmission cross member accommodating a single exhaust system, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A transmission cross member for accommodating a dual exhaust system and replacing an existing transmission cross member accommodating a single exhaust system of a vehicle, wherein the dual exhaust system has head pipes, wherein the vehicle has a chassis, and wherein the chassis of the vehicle has a pair of rails, a driver side, and a passenger side, said transmission cross member comprising:
   a) a center portion;
   b) a pair of intermediate portions; and
   c) a pair of outer portions;
   wherein said center portion is for mounting the transmission;
   wherein said pair of intermediate portions extend from said center portion;
   wherein said pair of intermediate portions are for straddling the tail piece of the transmission;
   wherein said pair of intermediate portions are for accommodating the dual exhaust system;
   wherein said pair of outer portions extend from said pair of intermediate portions, respectively; and
   wherein said pair of outer portions are for attaching to the pair of rails of the chassis of the vehicle;
   wherein said center portion is straight;
   wherein said center portion is slender;
   wherein said center portion is elongated;
   wherein said center portion is square-shaped in lateral cross section so as form a box member;
   wherein said center portion is horizontally-oriented;
   wherein said center portion has an uppermost surface;
   wherein said uppermost surface of said center portion is for mounting the transmission;
   wherein said center portion has a pair of ends;
   wherein said center portion has a height;
   wherein said center portion has a lowermost surface.
   wherein each intermediate portion is for accommodating a respective head pipe of the dual exhaust system;
   wherein each intermediate portion is inverted U-shaped;
   wherein each intermediate portion has a pair of upright parts;
   wherein said pair of upright parts of each intermediate portion are vertically-oriented;
   wherein said pair of upright parts of each intermediate portion have lowermost ends;
   wherein each intermediate portion has a transverse part;
   wherein said transverse part of each intermediate portion is horizontally-oriented; and
   wherein said transverse part of each intermediate portion extends across an associated pair of upright parts.

2. The transmission cross member as defined in claim 1, wherein said pair of upright parts of each intermediate portion have equal heights.

3. The transmission cross member as defined in claim 2,
   wherein said height of said pair of upright parts of said intermediate portion that is positioned on the passenger side of the chassis of the vehicle is greater than said height of said pair of upright parts of said intermediate potion that is positioned on the driver side of the chassis of the vehicle because the head pipe of the dual exhaust system that is positioned on the passenger side of the chassis of the vehicle mounts higher than the head pipe of the dual exhaust system that is positioned on the driver side of the chassis of the vehicle.

4. The transmission cross member as defined in claim 2,
   wherein said lowermost end of each innermost upright part of said pair of intermediate portions are flush with said lowermost surface of said center portion; and
   wherein said height of said center portion is less than said height of said pair of upright parts of said pair of intermediate portions for providing clearance for the tail piece of the transmission.

5. The transmission cross member as defined in claim 2,
   wherein each outer portion is straight;
   wherein each outer portion is slender;
   wherein each outer portion is elongated;
   wherein each outer portion is square-shaped in lateral cross section so as form a box member;
   wherein each outer portion is horizontally-oriented;
   wherein each outer portion has a height;
   wherein each outer portion has an innermost end;
   wherein each outer portion has an outermost end; and
   wherein said outermost end of each outer portion is for attaching to a respective rail of the chassis of the vehicle.

6. The transmission cross member as defined in claim 5,
   wherein said pair of outer portions extend from said pair of intermediate portions, respectively; and
   wherein said innermost end of each outer portion is coincident with an outermost upright part of a respective intermediate portion.

7. The transmission cross member as defined in claim 5,
   wherein each outer portion has a mounting flange;
   wherein said mounting flange extends from said outermost end of each outer portion; and wherein said mounting flange is for attaching to an associated rail of the chassis of the vehicle.

8. The transmission cross member as defined in claim 7, wherein said mounting flange is an angle iron;

wherein said angle iron is oriented in an inverted L-shape;

wherein said angle iron has an upright part;

wherein said upright part of said angle iron is vertically-oriented;

wherein said upright part of said angle iron has a height;

wherein said angle iron has a transverse part;

wherein said transverse part of said angle iron is horizontally-oriented;

wherein said transverse part of said angle iron extends outwardly from said upright part of said angle iron;

wherein said transverse part of said angle iron is for positioning over the associated rail of the chassis of the vehicle; and wherein said transverse part of said angle iron is for attaching to the associated rail of the chassis of the vehicle.

9. The transmission cross member as defined in claim 8, wherein said mounting flange extends outwardly from said outermost end of a respective outer portion; and wherein said upright part of said mounting flange is coincident with said outermost end of said respective outer portion.

10. The transmission cross member as defined in claim 8, wherein said height of said upright part of said mounting flange is equal to said height of an associated outer portion for providing a smooth attaching to an associated side rail of the chassis of the vehicle.

11. The transmission cross member as defined in claim 8, wherein said transverse part of said mounting flange has a plurality of throughbores;

wherein said plurality of throughbores extend vertically through said transverse part of said mounting flange; and wherein said plurality of throughbores are for receiving bolts to attach said transmission cross member to the pair of side rails of the chassis of the vehicle.

12. The transmission cross member as defined in claim 1, wherein said pair of intermediate portions extend coaxially from said pair of ends of said center portion, respectively; and wherein an innermost upright part of each intermediate portion is coincident with a respective end of said center portion.

13. The transmission cross member as defined in claim 1, wherein said outer portion that is positioned on the passenger side of the chassis of the vehicle slants rearwardly from said associated intermediate portioned; and wherein said outer portion that is positioned on the driver side of the chassis of the vehicle slants forwardly from said associated intermediate portion.

* * * * *